United States Patent Office 2,929,710

Patented Mar. 22, 1960

2,929,710

POLYVINYL ACETAL WITH TERMINAL VINYLIDENE GROUPS

Elmore Louis Martin, Wilmington, Del., assignor to E. I. du Pont de Nemours and Company, Wilmington, Del., a corporation of Delaware No Drawing. Application October 8, 1954
Serial No. 461,291

15 Claims. (Cl. 96—115)

This invention pertains to new polymers capable of addition polymerization and more particularly to solvent-soluble linear polymers which contain extralinear ethylenically unsaturated groups and to their preparation. Still more particularly, it pertains to solid polyacetals of essentially linear hydroxyl polymers having a plurality of intralinear vinyl alcohol (—$CH_2CHOH$—) groups and a plurality of extralinear vinylidene ($CH_2=C<$) groups in a conjugated system of double bonds. The invention also relates to polymerizable compositions containing such polyacetals and an addition-polymerization initiator activatable by actinic light and to sheet articles having a solid layer of such composition.

An object of this invention is to provide a new class of polymeric compounds which are soluble in solvents, e.g., water, methanol, ethanol, acetone, dioxane, etc., but can be converted to solvent-insoluble polymers by addition polymerization. Another object is to prepare such compounds which can be rapidly converted to tough, smooth, solvent-insoluble shaped articles. Yet another object is to provide such compounds which can be converted into such articles by photopolymerization. A further object is to provide such compounds which can be used for making printing reliefs. A still further object is to provide such compounds from inexpensive and available compounds. A still further object is to provide new sheet articles coated with compositions containing such compounds which can be used to prepare printing reliefs. Still other objects will be apparent from the following description of the invention.

The novel polymeric compounds of this invention are solid polyacetals of essentially linear polymeric polyhydric alcohols having a large number of recurring intralinear —$CH_2CHOH$— units, said polyacetals also comprising a plurality of extralinear vinylidene $CH_2=C<$ groups, said groups being in conjugated systems of double bonds, i.e., each having its double bond conjugated with another double bond, the ratio of acetal groups to vinylidene groups in the polymer being from about 10:1 to about 1:10, which are soluble in solvents, e.g., methanol, ethanol, acetone and dioxane and form self-supporting non-tacky films.

In the description of the invention which follows, the polymeric polyhydric alcohol containing recurring intralinear —$CH_2CHOH$— groups will often be referred to simply as a polyvinyl alcohol, for the sake of brevity. It will be understood that this term refers broadly to a material having a plurality of polymerized vinyl alcohol, —$CH_2CHOH$— units, whether or not it is polyvinyl alcohol itself or one of a number of related derivatives which contain a large number of intralinear —$CH_2CHOH$— groups, said material having in general a molecular weight above about 5,000, preferably between about 5,000 and about 50,000.

In a preferred embodiment of the invention, the solid polyacetal is the reaction product of a polyvinyl alcohol with a terminally unsautrated aldehyde. In this case, the aldehyde is so chosen that the resulting polyacetal has a vinylidene group in a conjugated system even though the aldehyde carbonyl is no longer present. In other words, the aldehyde must contain a terminal conjugated system which is separate and independent from the aldehyde carbonyl, rather than a conjugated system (as, for example, in acrolein or crotonaldehyde) which includes the aldehyde carbonyl, since acetalization of the latter would give an acetal no longer containing a conjugated system. In polyacetals made solely from aldehydes containing a vinylidene group in a conjugated system independent from the carbonyl group, the ratio of acetal groups to vinylidene groups is necessarily the same as the ratio of carbonyl to vinylidene groups in the starting aldehyde, and is normally 1:1.

In another important embodiment, the solid polyacetal is the reaction product of a polyvinyl alcohol with an aldehyde, which may be saturated or unsaturated, and with an unsaturated reactant, preferably an α-methylene carboxylic acid, capable of reacting with the hydroxyl groups of the polyvinyl alcohol and having a vinylidene group in a conjugated system of double bonds. In polyacetals of this type, the ratio of acetal groups to vinylidene groups can vary widely; but for a good balance of properties, it should be within the range of about 10:1 to about 1:10.

The polyacetals of this invention always contain a plurality of vinylidene groups in conjugated double bond systems. This type of structure has been found necessary for photopolymerization to take place at a practical rate. Polymers having unconjugated vinylidene groups, e.g., allyl groups; or having conjugated unsaturation, but not including a vinylidene, i.e., terminal methylene group, do not photopolymerize alone with the conventional initiators, or, if they do, the polymerization rate is too slow to be practical, especially for making printing reliefs. Thus, the polyacetals of this invention contain groups $$CH_2=\underset{\displaystyle R}{\underset{|}{C}}-$$

where R is hydrogen or a monovalent radical, attached to an atom which is itself doubly bonded to another group (i.e., single atom or radical). Preferably, the vinylidene group $$CH_2=\underset{\displaystyle R}{\underset{|}{C}}-$$

is attached to carbon itself, doubly bonded to carbon or oxygen. It is necessary that a plurality of such vinylidene groups be present in each polyacetal molecule in order for the addition polymerization to produce a crosslinked structure.

The unsaturated polyvinyl acetals of this invention have good film-forming properties, freedom from tackiness, resistance to physical deformation, toughness and chemical stability and molecular weights from 6,000 to 150,000.

In the polyacetals defined above the polyhydric alcohol portion of the molecule is a hydroxyl polymer containing a large number of intralinear —$CH_2CHOH$— groups that is soluble in cold and/or hot water or is hydrophilic in character, i.e., forms films which do not dissolve but are freely water-permeable and swell. Such a polymer can be, for example, polyvinyl alcohol itself, i.e., a substantially completely hydrolyzed polyvinyl carboxylate; or it may be a partially hydrolyzed polymer of a vinyl carboxylate, particularly a vinyl ester of a monocarboxylic acid of one to four carbon atoms, e.g., vinyl formate, vinyl acetate, vinyl chloroacetate, vinyl propionate, vinyl butyrate, etc. The vinyl carboxylate should be sufficiently hydrolyzed so that the groups —$CH_2CHOH$— represent at least 50% of the polymer chain, i.e., for every 100 chain atoms there are at least 25 hydroxyl groups. Hydrolyzed interpolymers of vinyl esters with minor proportions (25% or less by weight) of other polymerizable vinyl compounds, e.g., vinyl chloride, methyl methacrylate, etc. are suitable. In particular, the hydrolyzed olefin/vinyl ester interpolymers and especially the hydrolyzed ethylene/vinyl acetate interpolymer having hydrophilic properties described in U.S. Patent 2,397,866 are useful. The preferred starting materials are the 50–100% hydrolyzed polyvinyl acetates.

In the polyvinyl acetals of this invention, it is preferred that between about 10% and about 90%, and still more preferably between 20% and 90% of the hydroxyl groups of the polyvinyl alcohol are acetalized. If less than about 10% of the hydroxyl groups be acetalized, the desired film toughness and resiliency characteristic of the polyvinyl acetals are not realized, even when many of the non-acetalized hydroxyl groups are replaced by other groups, e.g., acyl groups. The higher limit of about 90% acetalization is in the neighborhood of that obtainable by pushing the acetalization reaction to the maximum possible extent [see the papers by P. J. Flory in J. Am. Chem. Soc., 61, 1518 (1939), and 72, 5052 (1950), where it is shown by statistical analysis that reactions involving pairs of substituents X in a linear polymer composed of —$CH_2$—CHX— units cannot go to completion].

As has already been stated, the polyvinyl acetals of this invention may contain substituents besides the acetal groups, such substituents being preferably saturated acyl groups and/or unsaturated acyl groups, the latter furnishing the necessary vinylidene groups when the aldehyde furnishing the acetal groups contains no vinylidene groups. Other saturated or unsaturated substituents may also be present, e.g., ether groups. In general, it is preferable that as many as possible of the hydroxyl groups of the polyvinyl alcohol be substituted. The most useful products are those in which at least 80%, preferably at least 85% of the hydroxyl groups are substituted.

The polyvinyl acetals of unsaturated aldehydes may be prepared, for example, by reacting, under acetal-forming conditions, a polyvinyl alcohol with the appropriate aldehyde, or preferably with a monomeric acetal thereof, e.g., an acetal of an alkanol of 1 to 4 carbon atoms, for example, methanol or ethanol, or of a 1,2-or 1,3-alkanediol of 1 to 4 carbon atoms, such as ethylene glycol and propylene glycol, until acetalization of the hydroxyl groups has proceeded to the desired extent. Thus the reaction can be carried out at a temperature from 40° C. to 150° C. in the presence of an acid, e.g., hydrochloric, sulfuric, phosphoric, p-toluenesulfonic, methanesulfonic, chloroacetic, acetic, trifluoroacetic acid, etc. for a period of ½ to 48 or more hours. When the latter organic acid is used, a slight amount of esterification may take place. Simultaneously with the acetalization reaction or subsequently, additional substituents, preferably saturated aliphatic acyl groups, can be introduced to decrease further the amount of unreacted hydroxyl groups. This can be done, for example, by carrying out the acetalization reaction in a solvent medium which consists of or comprises a saturated monocarboxylic acid, e.g., glacial acetic acid, and may also contain the anhydride of the same acid to absorb the water formed in the reaction. When it is desired to introduce the necessary vinylidene groups through reactants other than the aldehyde, for example, through an unsaturated carboxylic acid, this can be done by simultaneous or, if desired, successive acetalization and acylation of the polyvinyl alcohol with the appropriate aldehyde and the appropriate acid containing a vinylidene group in a conjugated system of double bonds. The conventional acetalization and acylation procedures, catalysts and conditions can be used.

In a further important aspect of the invention, the novel polymeric polyvinyl acetals are admixed with an addition polymerization initiator which is activatable by actinic light of wavelengths from 1800 to 7000 A. and a suitable solvent to form photopolymerizable compositions which can be coated, cast or extruded into a self-supporting film which is later laminated to a suitable support or coated onto a suitable support, e.g., metal sheet or plate, hydrophobic film, impregnated paper or cardboard or laminated paper sheet and dried to remove water and/or an organic solvent. The resulting sheet elements which bear a photopolymerizable layer can be used to prepare relief images, particularly printing reliefs.

In order to increase the storage stability of the compositions, it is desirable that they contain a small amount, e.g., between 0.005 and 0.02% by weight, of one of the known polymerization inhibitors such as hydroquinone or 4-hydroxydiphenyl. The presence of an inhibitor in such small amounts prevents premature polymerization but does not interfere with the photopolymerization under the conditions described.

The invention is illustrated in greater detail by the following examples, in which parts are by weight, unless otherwise noted. These examples show some of the preferred polymers of this invention and suitable methods for preparing them. They also show the utilization of these polymers in one of their principal applications, viz., the preparation of printing relief images.

EXAMPLE I

A. *m-Methacrylamidobenzaldehyde ethylene glycol acetal*

To a mechanically stirred solution of 50 parts of m-aminobenzaldehyde ethylene glycol acetal (U.S. 2,481,434) in 40 parts of acetone and 5 parts of ice, there was added dropwise a solution of 31 parts of methacrylyl chloride in 30 parts of anhydrous dioxane. The temperature was maintained at 0–5° C. by means of external cooling and the pH of the reaction was kept at 7–9 by the portionwise addition of a solution of 50 parts of potassium carbonate and 50 parts of water. The reaction product, m-methacrylamidobenzaldehyde ethylene glycol acetal, separated as a colorless crystalline solid. The reaction mixture was stirred for an additional period of 30 minutes and was diluted to a volume of 500 parts with cold water. The m-methacrylamidobenzaldehyde ethylene glycol acetal was collected and washed with cold water and the moist filter cake was dissolved in methylene chloride. The organic layer was separated, dried with anhydrous magnesium sulfate and concentrated by evaporation of the solvent until the internal temperature reached 48° C. The mixture was cooled slightly and diethyl ether was added until crystals appeared. After cooling to 0° C. the colorless crystals of m-methacrylamidobenzaldehyde ethylene glycol acetal were collected, washed with cold diethyl ether and dried. The yield of colorless crystals melting at 113–114° C. was 50 parts.

*Analysis.*—Calc'd for $C_{13}H_{15}O_3N$: C, 66.92; H, 6.49; N, 6.01. Found: C, 66.67; H, 6.64; N, 6.06.

B. *m-Methacrylamidobenzaldehyde polyvinyl acetal*

A mixture of 5 parts of an 86–89% hydrolyzed polyvinyl acetate having a viscosity of 4–6 centipoises for a 4% water solution at 20° C. (a polyvinyl alcohol commercially sold under the trademark "Elvanol" 51–05), 2 parts of m-methacrylamidobenzaldehyde ethylene glycol acetal (sufficient to react with about 19% of the hydroxyl groups present), 20 parts of glacial acetic acid, 1.5 parts of trifluoroacetic acid, and 0.03 part of hydroquinone was stirred at 85° C. for 1.5 hours. The m-methacrylamidobenzaldehyde polyvinyl acetal was precipitated from the resulting pale yellow solution by addition of about 30 parts of diethyl ether followed by the addition of 20 parts of petroleum ether. The solvents were decanted from the precipitated product and the heavy, gummy mass was washed with ether. The precipitated polyvinyl acetal was dissolved in about 15 parts of methanol and reprecipitated by the addition of 30–40 parts of ether. The solution and precipitation processes were repeated a second and third time. After the third precipitation from methanol, the m-methacrylamidobenzaldehyde polyvinyl acetal was dissolved in methanol and the resulting solution was filtered, the filtered solution coated on a glass plate and the methanol was allowed to evaporate leaving a colorless, transparent, flexible film. The nitrogen content of the solvent-free polymer was 1.91%, indicating that essentially all of the monomeric m-methacrylamidobenzaldehyde ethylene glycol had been converted to the polyvinyl acetal. This polymer was a polyvinyl acetal containing, besides unreacted hydroxyl groups in intralinear —$CH_2CHOH$— groups, m-methacrylamidobenzaldehyde acetal groups of the structure:

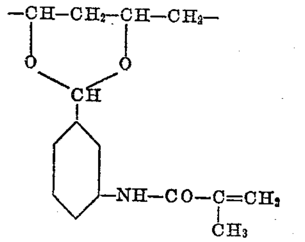

and acetoxy groups, the latter being present in the original partially hydrolyzed polyvinyl acetate and also resulting from esterification during the acetalization reaction. The polymer was soluble in methanol, ethanol and ethylene glycol but was insoluble in esters, e.g., ethyl acetate and methyl acetate, and was insoluble in water.

C. *Preparation of printing relief images*

To a methanol solution of the m-methacrylamidobenzaldehyde polyvinyl acetal, prepared as described under section B, there was added 1% of the solids content of benzoin methyl ether. There was also added 0.01%, based on the solids content, of hydroquinone to prevent premature polymerization and insolubilization. The resulting solution was cast on glass plates to give films having a thickness of 0.010–0.020 inch after evaporation of the solvent. The methanol was allowed to evaporate at room temperature in subdued light. The resulting solid, transparent, tack-free films adhered tenaciously to glass. The polyvinyl acetal layer was placed in intimate contact with a suitable line negative, the resulting assembly was placed on a turntable on a piece of black paper to serve as an anti-halation layer and exposed for a period of 15 minutes under four mercury vapor sunlamps suitably arranged at a distance of 12–14 inches from the surface of the layer. After removal of the negative, the unexposed material was removed by washing in methanol for 5–10 minutes. The resulting plate had scratch-resistant printing relief images of excellent sharpness having deep recess areas.

EXAMPLE II

A. *p-Vinylbenzaldehyde ethylene glycol acetal*

To a mechanically stirred solution of 27 parts of 85% potassium hydroxide in 160 parts of 95% ethanol at 60° C. was added 80 parts of p-(2-bromoethyl)benzaldehyde ethylene glycol acetal. The temperature rose to 70° C. and crystals of potassium bromide separated. The reaction mixture was maintained at 70° C. for 15 minutes and most of the ethanol was removed by distillation under reduced pressure. The residue was diluted with water, the organic material was extracted with diethyl ether and after concentration of the ether extract, the residual p-vinylbenzaldehyde ethylene glycol acetal was distilled. The fraction boiling at 105° C. at 1 mm. was recovered as substantially pure p-vinylbenzaldehyde ethylene glycol acetal.

*Analysis.*—Calc'd for $C_{11}H_{12}O_2$: C, 74.96; H, 6.87. Found: C, 75.19; H, 7.29.

B. *p-Vinylbenzaldehyde polyvinyl acetal*

A mixture of 5 parts of the hydrolyzed polyvinyl acetate used in Example I, 2.5 parts of p-vinylbenzaldehyde ethylene glycol acetal (sufficient to react with about 32% of the hydroxyl groups present), 20 parts of glacial acetic acid, 1.5 parts of trifluoroacetic acid and 0.03 part of hydroquinone was stirred at 85–87° C. for two hours. The p-vinylbenzaldehyde polyvinyl acetal thus obtained was freed of hydroquinone and acetic acid essentially as described in Example I, section B. This polymer was a polyvinyl acetal containing, besides residual hydroxyl groups in intralinear —$CH_2CHOH$— groups, acetoxy groups from the starting material and from further esterification by the acetic acid, and p-vinylbenzaldehyde acetal units of the formula:

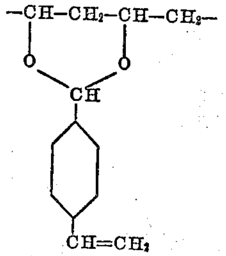

In the latter groups, the vinylidene group is conjugated with a benzenoid double bond.

C. *Preparation of printing relief images*

To the methanol solution of p-vinylbenzaldehyde polyvinyl acetal obtained as described under section B was added 0.07 part of benzoin methyl ether and 0.01%, by weight of the solids content, of hydroquinone to stabilize against premature gelation and the resulting solution was cast on glass plates. After removal of the methanol by evaporation, a transparent, hard film was obtained that adhered tenaciously to glass. Exposure under a suitable line negative and removal of unexposed material essentially as described in Example I, section C gave scratch-resistant printing relief images of excellent sharpness having deep recess areas.

EXAMPLE III

A. *m-(p-Vinylbenzenesulfonamido)benzaldehyde ethylene glycol acetal*

To a solution of 150 parts of m-aminobenzaldehyde ethylene glycol acetal, 240 parts of acetone, 150 parts of water and 150 parts of potassium carbonate at 5–7° C., there was added the sulfonyl chloride obtained by the chlorosulfonation of 200 parts of (2-bromoethyl)benzene as described by Inskeep and Deanin, J. Am. Chem. Soc., 69, 2237 (1947). The resulting reaction mixture was stirred at 5–10° C. for 20 hours, then it was diluted with water and the liquid organic layer was separated and washed with water by decantation. The resulting low-melting m-[p-(2-bromoethylbenzenesulfonamido] benzaldehyde ethylene glycol acetal, without further purification, was added to a solution of 165 parts of 85% potassium hydroxide in 700 parts of 95% ethanol at 50° C. The temperature rose to 67° C. and crystals of potassium bromide separated. After the mixture had been maintained at 65–69° C. for 65 minutes, most of the ethanol was removed by distillation under reduced pressure and the residue was diluted with water. The resulting solution was acidified by the addition of acetic acid, whereupon an oil separated that soon solidified. Crystallization of the solidified product from a large volume of methylene chloride gave 145 parts of colorless crystals of m-(p-vinylbenzenesulfonamido)benzaldehyde ethylene glycol acetal, melting at 140–142° C.

*Analysis.*—Calc'd for $C_{17}H_{17}O_4NS$: C, 61.59; H, 5.18; N, 4.23; S, 9.68. Found: C, 61.80; H, 5.14; N, 4.03; S, 9.59.

B. *m-(p-Vinylbenzenesulfonamido)benzaldehyde polyvinyl acetal*

A mixture of 25 parts of the hydrolyzed polyvinyl acetate used in Example I, 15 parts of m-(p-vinylbenzenesulfonamido)benzaldehyde ethylene glycol acetal (sufficient to react with about 20% of the hydroxyl groups present), 100 parts of glacial acetic acid, 7.5 parts of trifluoroacetic acid and 0.2 part of hydroquinone was stirred at 85–87° C. for two hours. The resulting m-(p - vinylbenzenesulfonamido)benzaldehyde polyvinyl acetal was freed of excess hydroquinone and acetic acid essentially as described in Example I, section B. This polymer was a polyvinyl acetal having, besides residual hydroxyl groups in intralinear —$CH_2CHOH$— groups, acetoxy groups and acetal groups of the formula:

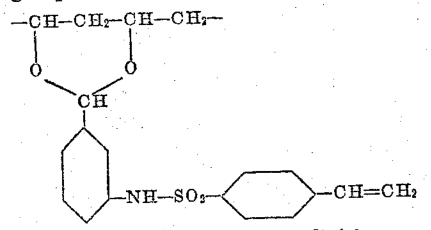

C. *Preparation of printing relief images*

To 30 parts of the methanol solution containing approximately 12 parts of m-(p-vinylbenzenesulfonamido) benzaldehyde polyvinyl acetal prepared as described under section B, there was added 0.12 part of benzoin methyl ether and about 0.001 part of hydroquinone and the solution was cast on glass plates. After evaporation of the methanol, a transparent, non-tacky solid layer was obtained that adhered tenaciously to glass. Exposure under a suitable line negative and removal of unexposed material essentially as described in Example I, section C, gave a scratch-resistant printing relief image of excellent sharpness having deep recess areas. An excellent relief printing image was obtained by adding to the photopolymerizable composition 25% (based on the weight of the polyvinyl acetal) of the bis-methacrylate ester of polyethylene glycol of average molecular weight 200, as a plasticizer and additional crosslinking agent.

EXAMPLE IV

A. *m-Methacrylamidobenzaldehyde polyvinyl acetal containing acrylyloxy groups*

A mixture of 10 parts of the hydrolyzed polyvinyl acetate used in Example I, 4 parts of m-methacrylamidobenzaldehyde ethylene glycol acetal (enough to react with about 19% of the hydroxyl groups present), 40 parts of acrylic acid (a large excess over the calculated amount), 3 parts of trifluoroacetic acid and 0.06 part of hydroquinone was stirred at 90–95° C. for three hours. The resulting polymer was freed of excess hydroquinone and acrylic acid essentially as described in Example I, section B. Evaporation of the methanol solution gave a clear hard film. This polymer was a polyvinyl acetal containing, besides hydroxyl groups in intralinear

—$CH_2CHOH$— groups, acetoxy groups, acrylyloxy groups and m-methacrylamidobenzaldehyde acetal groups.

B. *Preparation of printing relief images*

To 50 parts of the methanol solution containing approximately 16 parts of the above polyvinyl acetal was added 0.18 part of benzoin methyl ether and about 0.0015 part of hydroquinone and the resulting solution was cast on glass plates. After removal of the methanol at room temperature under subdued light, the layer of solid polymer was exposed under a line negative and unexposed material was removed essentially as described in Example I, section C. Scratch-resistant printing relief images of excellent sharpness with deep recess areas remained adherent to the surface of the glass plate after removal of the unexposed material.

EXAMPLE V

A. *Benzaldehyde polyvinyl acetal containing acrylyloxy groups*

A mixture of 10 parts of the hydrolyzed polyvinyl acetate used in Example I, 40 parts of acrylic acid (a large excess), 1.2 parts of benzaldehyde (enough to react with about 12% of the hydroxyl groups), 3 parts of trifluoroacetic acid and 0.03 part of hydroquinone was stirred at 90–95° C. for three hours. The resulting polymer was freed of excess hydroquinone, acrylic acid and benzaldehyde essentially as described in Example I, section B. This polymer was a polyvinyl acetal containing, in addition to hydroxyl groups in intralinear —$CH_2CHOH$— groups, acetoxy groups, acrylyloxy groups and benzaldehyde acetal groups. In this case, the vinylidene unsaturation was provided solely by the acryloxy groups.

B. *Preparation of printing relief images*

To the methanol solution of the above polyacetal was added 0.18 part of benzoin methyl ether and 0.01% of hydroquinone, based on the solids content, and the resulting solution was cast on glass plates. After removal of the methanol by evaporation at room temperature, a non-tacky solid layer was obtained. Exposure under a suitable negative and removal of unexposed material essentially as described in Example I, section C, gave soft, highly resilient images.

EXAMPLE VI

A. *m-Methacrylamidobenzaldehyde polyvinyl acetal*

A mixture of 50 parts of the polyvinyl alcohol (hydrolyzed polyvinyl acetate) used in Example I, 37.5 parts of m-methacrylamidobenzaldehyde ethylene glycol acetal (sufficient to react with about 36% of the hydroxyl groups present), 200 parts of glacial acetic acid, 15 parts of trifluoroacetic acid and 0.3 part of hydroquinone was stirred at 85–87° C. for one hour. Twenty (20) parts of acetic anhydride was added dropwise during the course of 30 minutes and the reaction was continued for an additional period of 30 minutes. The polyvinyl acetal was freed of excess hydroquinone and acetic acid essentially as described in Example I, section B. There was obtained 300 parts of solution of the polyvinyl acetal containing 31% solids. The solid had a nitrogen content of 2.41% (theoretical 2.42%). This polymer was essentially similar to that of Example I except that both the extent of acetalization and the extent of acetylation were higher. From the weight of polyvinyl acetal obtained and its nitrogen content, it can be calculated that it contained, by weight, 44.5% of m-methacrylamidobenzaldehyde polyvinyl acetal, 46% of polyvinyl acetate and 9.5% of polyvinyl alcohol. This polymer was, therefore, a polyvinyl alcohol in which about 31% of the hydroxyl groups were acetalized and about 50% of them acetylated.

B. *Preparation of printing relief images*

To 20 parts of the above solution was added 0.06 part of benzoin methyl ether and 0.01% of hydroquinone, based on the solids content, and the solution was cast on glass plates. Removal of the methanol by evaporation at room temperature gave clear hard films having a thickness of 0.028–0.030 inch. Exposure of the polymer under a line negative and removal of the unexposed material essentially as described in Example I, section C, gave scratch-resistant printing relief images of excellent sharpness with deep recess areas. A similar printing relief was obtained when 20 parts of the methanol solution of the m-methacrylamidobenzaldehyde polyvinyl acetal was mixed with 0.08 part of benzoin methyl ether and 1.8 parts of the bis-methacrylate ester of a polyethylene glycol of average molecular weight 200, to act as plasticizer and additional crosslinking agent.

The next three examples illustrate the use of a photopolymerizable monomer in admixtures with the addition-polymerizable polyvinyl acetal in elements suitable for the preparation of printing relief images. The resulting compositions had faster photopolymerization rates than the unmodified ones and the images were more solvent-resistant.

EXAMPLE VII

To 20 parts of a methanol solution of a m-methacrylamidobenzaldehyde polyvinyl acetal containing 44% solids and prepared essentially as described in Example I, there was added 0.1 part of benzoin methyl ether, about 0.0009 part of hydroquinone and 2 parts of acrylamide. The resulting solution was cast on glass plates and after removal of the methanol by evaporation at room temperature, a clear, hard, non-tacky film 0.015–0.020 inch thick was obtained. Exposure of the film under a line negative and removal of unexposed material essentially as described in Example I, section C, gave a scratch-resistant printing relief image of excellent sharpness with deep recess areas.

EXAMPLE VIII

To 10 parts of a methanol solution of a m-methacrylamidobenzaldehyde polyvinyl acetal containing 40% solids and prepared essentially as described in Example I, there was added 0.12 part of benzoin methyl ether, about 0.0004 part of hydroquinone, 0.5 part of acrylamide and 0.5 part of methacrylamide. The resulting solution was cast on glass plates at such a thickness as to give films having a thickness of 0.015–0.025 inch after removal of the methanol by evaporation at room temperature. Exposure of the resulting hard, non-tacky, transparent film under a negative and removal of the unexposed material essentially as described in Example I, section C, gave scratch-resistant printing relief images of excellent sharpness with deep recess areas.

EXAMPLE IX

To 20 parts of the same methanol solution as used in Example VIII, there was added 0.65 part of benzoin methyl ether, about 0.0008 part of hydroquinone, 1.7 parts of the bis-methacrylate ester of polyethyleneglycol (average molecular weight 200) and 1 part of acrylamide. The resulting solution was cast on glass plates at such a thickness as to give films having a thickness of 0.025–0.030 inch, after removal of the methanol by evaporation at room temperature. Exposure of the resulting hard, non-tacky, transparent film under a line negative and removal of the unexposed material essentially as described in Example I, section C, give scratch-resistant printing relief images of excellent sharpness with deep recess areas.

EXAMPLE X

A. *n-Butyraldehyde polyvinyl acetal containing methacrylyloxy groups*

A mixture of 5 parts of the polyvinyl acetal obtained by acetalizing polyvinyl alcohol with n-butyraldehyde until about 80% of the hydroxyl groups are reacted, 25 parts of methacrylic acid, 1.5 parts of trifluoroacetic acid and 0.05 part of hydroquinone was stirred at 85–90° C. for one hour. The polymer was precipitated from the resulting clear solution by the addition of ether and freed of excess hydroquinone and methacrylic acid essentially as described in Example I, section B. Evaporation of a test portion of the methanol solution on a glass plate gave a colorless, transparent, tough film. This polymer was a polyvinyl acetal containing, besides hydroxyl groups in intralinear —$CH_2CHOH$— groups, methacrylyloxy groups and n-butyraldehyde acetal groups.

B. *Preparation of printing relief images*

To the methanol solution of the polyvinyl acetal prepared as described in section A, there was added 0.05 part of benzoin methyl ether and 0.01% of hydroquinone, based on the solids content, and the resulting solution was cast on glass plates to form films having a thickness of 0.010–0.015 inch, after removal of the methanol by evaporation at room temperature. Exposure of the resulting hard, transparent film under a line negative and removal of the unexposed material essentially as described in Example I, section C, gave images which, while useful as printing reliefs, were slightly attacked by the methanol used to remove the unexposed material.

EXAMPLE XI

A. *m-Methacrylamidobenzaldehyde polyvinyl acetal*

A mixture of 5 parts of the polyvinyl alcohol used in Example I, 20 parts of m-methacrylamidobenzaldehyde ethylene glycol acetal (nearly twice the amount calculated to react with all the hydroxyl groups present), 20 parts of ethanol, 0.1 part of hydroquinone and 0.5 part of a 10% aqueous solution of sulfuric acid was stirred at 60–65° C. for one hour whereupon 2.5 parts of a 10% solution of triethylamine in methanol was added. To the resulting solution was added diethyl ether to precipitate the polyvinyl acetal. The excess hydroquinone was removed essentially as described in Example I, section B, except that a mixed solvent of 3 parts of methylene chloride and 1 part of ethanol, by volume, was used in place of the methanol in Example I, section B. This polyvinyl acetal was similar in structure to that of Example I except that it contained less acetoxy groups and more acetal groups. Analysis of a portion of the solid polymer gave a nitrogen content of 4.24%. This shows that about 85% of the available hydroxyl groups were acetalized, since complete acetalization would correspond to 4.96% nitrogen.

B. *Preparation of printing relief images*

To the methylene chloride-ethanol solution of the polyvinyl acetal prepared under section A was added 0.02 part of benzoin methyl ether and 0.01% of hydroquinone, based on the solids content, and the solution was cast on glass plates to give films having a thickness of 0.010–0.015 inch on evaporation of the solvents at room temperature. Exposure of the resulting hard, transparent film under a line negative and removal of the unexposed material essentially as described in Example I, section C, except that a mixture of methylene chloride-ethanol was used in place of methanol, gave hard printing relief images of excellent sharpness.

EXAMPLE XII

A. *p-Vinylbenzaldehyde polyvinyl acetal*

A mixture of 5 parts of the polyvinyl alcohol used in Example I, 15 parts of p-vinylbenzaldehyde ethylene glycol acetal (nearly twice the amount calculated to react with all the hydroxyl groups present), 20 parts of ethanol, 0.1 part of hydroquinone and 0.5 part of 10% aqueous sulfuric acid was stirred at 60–65° C. for one hour whereupon 2.5 parts of a 10% solution of triethylamine in methanol was added. The polyvinyl acetal was precipitated by the addition of diethyl ether and freed of excess hydroquinone essentially as described in Example I, section B, except that a mixed solvent of 3 parts of ethyl acetate and 1 part of ethanol, by volume, was used in place of methanol. Casting a test portion of the solution of the polyvinyl acetal on a glass plate gave a hard, transparent flexible film. This polymer was similar in structure to that of Example II except that it contained less acetoxy groups and more acetal groups.

B. *Preparation of printing relief images*

To the ethyl acetate-ethanol solution of the polyvinyl acetal prepared in section A was added 0.1 part of benzoin methyl ether and 0.01% of the hydroquinone, based on the solids content, and one-half of the solution was cast on glass plates to give films having a thickness of 0.010–0.015 inch after evaporation of the solvents at room temperature. To the remainder of the original polymer solution was added an additional quantity of 0.02 part of benzoin methyl ether and 1.7 parts of the bis-methacrylate ester of polyethylene glycol of molecular weight 200. This solution was also cast on glass plates as previously described. The resulting hard, non-tacky films were exposed under a line negative and the unexposed material was removed essentially as described in Example I, section C, except that a mixed solvent, ethyl acetate-ethanol (3 to 1 by volume) was used in place of methanol. Both compositions gave scratch-resistant printing relief images of good sharpness with deep recess areas.

EXAMPLE XIII

A. *m-Methacrylamidobenzaldehyde/o-chlorobenzaldehyde polyvinyl acetal*

A mixture of 15 parts of medium viscosity completely hydrolyzed polyvinyl alcohol (commercially sold under the trademark "Elvanol" 90–25), 13 parts of m-methacrylamidobenzaldehyde ethylene glycol acetal, 10.5 parts of o-chlorobenzaldehyde, 100 parts of glacial acetic acid, 7.5 parts of trifluoroacetic acid, 30 parts of chloroform and 0.1 part of hydroquinone was stirred at 65° C. for 1.5 hours. The polyvinyl acetal was freed of hydroquinone and acetic acid essentially as described in Example I, section B, except that dioxane was used as the solvent in place of methanol. There was obtained 198 parts of dioxane solution having a solids content of 19%. Analysis of a portion of the solvent-free film gave a nitrogen content of 2.40% and a chlorine content of 5.88%. These figures indicate that the polymer contained 44.5% m-methacrylamidobenzaldehyde polyvinyl acetal, 35.3% o-chlorobenzaldehyde polyvinyl acetal, 17.8% of polyvinyl acetate and 2.8% of unchanged polyvinyl alcohol. This polymer was a polyvinyl alcohol derivative in which about 72% of the hydroxyl groups were acetalized and about 22% of them were acetylated.

B. *Preparation of printing relief images*

To 53 parts of the above dioxane solution of the polyvinyl acetal was added 0.1 part of benzoin methyl ether and 0.001 part of hydroquinone and the solution was cast on glass plates. Removal of the dioxane at room temperature in subdued light gave a clear, transparent flexible film. Exposure of the film under a suitable line negative and removal of unexposed material essentially as described in Example I, section C, gave a scratch-resistant image of excellent sharpness with deep recess areas.

EXAMPLE XIV

A. *m-Methacrylamidobenzaldehyde/3,4-dichlorobenzaldehyde polyvinyl acetal*

A mixture of 10 parts of completely hydrolyzed high viscosity polyvinyl alcohol (commercially sold under the trademark "Elvanol" 72–60), 15 parts of m-methacrylamidobenzaldehyde ethylene glycol acetal, 8.8 parts of 3,4-dichlorobenzaldehyde, 125 parts of glacial acetic acid, 7.5 parts of trifluoroacetic acid and 0.1 part of hydroquinone was stirred at 65–70° C. for 1.5 hours. On addition of diethyl ether to the vigorously stirred reaction mixture, the polyvinyl acetal separated as a finely divided solid. The solid was collected, washed with diethyl ether and slurried for 15 minutes with such ether. The solid polymer was again collected and slurried for 30 minutes with diethyl ether, and the slurrying steps were repeated a third and fourth time with fresh ether to remove the hydroquinone and acetic acid. The resulting dry powder (25 parts) had a nitrogen content of 2.55%, and a chlorine content of 9.78%. These figures indicate that the polymer contained 47% m-methacrylamidobenzaldehyde polyvinyl acetal, 33.9% 3,4-dichlorobenzaldehyde polyvinyl acetal, 12.4% of polyvinyl acetate and 6.7% of unchanged polyvinyl alcohol. This polymer was a polyvinyl alcohol in which about 69% of the hydroxyl groups were acetalized and about 15% of them were acetylated. The polymer was soluble in dioxane or chloroform-dioxane mixtures.

EXAMPLE XV

A. *Methacrylamidoacetaldehyde ethylene glycol acetal*

To a solution of 31 parts of aminoacetaldehyde ethylene glycol acetal (prepared as described in Organic Syntheses, vol. 24, p. 3) and 50 parts of water cooled to 0–5° C. was added dropwise a solution of 35 parts of methacrylyl chloride in 35 parts of dioxane. The pH of the reaction mixture was maintained at 7–9 by the portionwise addition of a solution of 42 parts of potassium carbonate in 40 parts of water. After the addition of the acid chloride was complete, the reaction mixture was allowed to warm to 25° C. during the course of one hour and stirred an additional period of two hours at 25° C. The reaction mixture was extracted several times with ether, the ethereal solution was dried over magnesium sulfate and after filtering, the solution was concentrated. Distillation of the residue from 0.1 part of hydroquinone gave 40 parts of methacrylamidoacetaldehyde ethylene glycol acetal boiling at 120–122° C. at 1 mm. pressure.

*Analysis.*—Calc'd for $C_8H_{13}O_3N$: C, 56.11; H, 7.66. Found: C, 56.34; H, 7.75.

B. *Methacrylamidoacetaldehyde polyvinyl acetal*

A mixture of 10 parts of 86–89% hydrolyzed low viscosity polyvinyl alcohol, 14 parts of methacrylamidoacetaldehyde ethylene glycol acetal, 0.3 part of hydroquinone, 50 parts of glacial acetic acid and 0.4 part of p-toluene-sulfonic acid monohydrate was stirred at 65° C. for 1.25 hours. A solution of 2.5 parts of 10% triethylamine in methanol was added to neutralize the sulfonic acid catalyst and the methacrylamidoacetaldehyde polyvinyl acetal was precipitated by the addition of diethyl ether and freed of hydroquinone and acetic acid essentially as described in Example I, section B. There was obtained 58 parts of methanol solution of the polyvinyl acetal, having a solids content of 32%. The solid polymer had a nitrogen content of 5.21%. On the basis of these figures, the solid polyvinyl acetal had a methacrylamidoacetaldehyde polyvinyl acetal content of 73.5%, a polyvinyl acetate content of 19% and unchanged polyvinyl alcohol content of 7.6%. This polymer was a polyvinyl alcohol derivative in which about 19% of the intralinear $—CH_2CHOH—$ groups were acetylated and about 65% of them were replaced by acetal units of the formula:

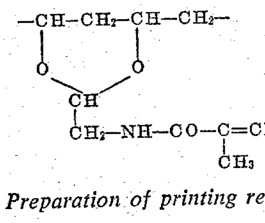

C. *Preparation of printing relief images*

To 31 parts of the above methanol solution, there was added 0.1 part of benzoin methyl ether and 0.001 part of hydroquinone and the resulting solution was cast on glass plates. Removal of the methanol at room temperature in subdued light gave a clear, transparent flexible film. Exposure under a suitable line negative essentially as described in Example I, section C, gave hard, scratch-resistant printing relief images of excellent sharpness with deep recess areas.

EXAMPLE XVI

A. *p-Methacrylyloxybenzaldehyde*

To a solution of 73 parts of p-hydroxybenzaldehyde and 71 parts of anhydrous triethylamine in 200 parts of methylene chloride, there was added dropwise, with stirring, a solution of 73 parts of metharcrylyl chloride in 75 parts of methylene chloride, the temperature being maintained at 15–20° C. by means of external cooling. The mixture was stirred at 20–25° C. for an additional period of one hour after the adidtion of the acid chloride was complete. Two hundred (200) parts of water containing 10 parts of concentrated hydrochloric acid was added and the organic layer was separated and washed twice with 1% hydrochloric acid. After drying and adding 0.2 part of hydroquinone, the solution was concentrated and the residue was distilled. There was obtained 86 parts of p-methacrylyloxybenzaldehyde boiling at 115–120° C. at 1 mm. and melting at 27–29° C.

*Analysis*.—Calc'd for $C_{11}H_{10}O_3$: C. 69.44; H, 5.30. Found: C, 69.49; H, 5.43.

B. *p-Methacrylyloxybenzaldehyde polyvinyl acetal*

A vessel containing a mixture of 10 parts of 86–89% hydrolyzed polyvinyl acetate (a low viscosity polyvinyl alcohol), 25 parts of p-methacrylyloxybenzaldehyde (an excess over the quantity required to acetalize all the hydroxyl groups), 80 parts of glacial acetic acid, 6 parts of trifluoroacetic acid, and 0.1 part of hydroquinone was placed in a water bath at 60° C. After stirring for 10 minutes at a bath temperature of 58–60° C., the bath temperature was allowed to drop to 55° C. during the course of 5 minutes. The reaction mixture was diluted with 20 parts of diethyl ether, the polyvinyl acetal was precipitated by the addition of a mixture of diethyl ether and petroleum ether, and freed of hydroquinone and acetic acid essentially as described in Example I, section B, except that acetone was used as the solvent in place of methanol. There was obtained 82 parts of acetone solution having a solids content of 27%. This polymer was a polyvinyl acetal containing, besides intralinear $$—CH_2CHOH—$$

groups and acetoxy groups, acetal groups of the formula

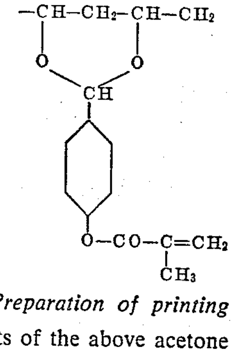

C. *Preparation of printing relief images*

To 37 parts of the above acetone solution of the polyvinyl acetal, there was added 0.1 part of benzoin methyl ether and 0.001 part of hydroquinone and the resulting solution was cast on glass plates. Removal of the acetone at room temperature in subdued light gave a clear, transparent film. Exposure of the film under a suitable negative and removal of the unexposed material essentially as described in Example I, section C, gave a hard, scratch-resistant image of excellent sharpness.

EXAMPLE XVII

*p-Methacrylyloxybenzaldehyde polyvinyl acetal*

A mixture of 10 parts of medium viscosity polyvinyl alcohol (completely hydrolyzed polyvinyl acetate), 25 parts of p-methacrylyloxybenzaldehyde (an excess over the quantity required to acetalize all the hydroxyl groups), 100 parts of glacial acetic acid, 7.5 parts of trifluoroacetic acid and 0.1 part of hydroquinone was stirred at 60° C. for 10 minutes and then at 55° C. for an additional period of 5 minutes. The polyvinyl acetal was precipitated by the addition of diethyl ether and the hydroquinone and acetic acid were removed essentially as described in Example I, section B. The acetone solution (121 parts) had a solids content of 21%. Cast films containing 1% by weight of benzoin methyl ether and 0.01% of hydroquinone gave hard printing relief images of excellent sharpness on exposure under a suitable line negative and removal of unexposed material essentially as described in Example I, section C. Similar results are obtained by substituting for the acetone, chloroform and substituting for the medium viscosity polyvinyl alcohol (which had a viscosity of 20–25 centipoises), a high viscosity polyvinyl alcohol (i.e., a completely hydrolyzed polyvinyl acetate having a viscosity of 45–55 centipoises).

EXAMPLE XVIII

A. *o-Methacrylyloxybenzaldehyde*

To a solution of 122 parts of salicylaldehyde and 111 parts of anhydrous triethylamine in 350 parts of methylene chloride, there was added dropwise with stirring a solution of 115 parts of methacrylyl chloride in 100 parts of methylene chloride, the temperature being maintained at 15–20° C. by means of external cooling. The mixture was stirred at 20–25° C. for an additional period of one hour after the addition of the acid chloride was complete. Three hundred (300) parts of water containing 15 parts of concentrated hydrochloric acid was added, the organic layer was separated and washed twice with 1% hydrochloric acid. After drying and adding 0.3% part of hydroquinone, the solution was concentrated and the residue was distilled. There was obtained 162 parts of o-methacrylyloxybenzaldehyde boiling at 105–110° C. at 1 mm.

*Analysis*.—Calc'd for $C_{11}H_{10}O_3$: C, 69.44; H, 5.30. Found: C, 69.32; H, 5.52.

B. *o-Methacrylyloxybenzaldehyde polyvinyl acetal*

A mixture of 10 parts of 86–89% hydrolyzed low viscosity polyvinyl alcohol, 25 parts of o-methacrylyloxybenzaldehyde, 80 parts of glacial acetic acid, 6 parts of trifluoroacetic acid and 0.1 part of hydroquinone was stirred at 60–65° C. for 15 minutes. The reaction mixture was diluted with 20 parts of diethyl ether and the polyvinyl acetal was precipitated by the addition of a mixture of equal parts by volume of ether and petroleum ether. The polymer was freed of hydroquinone and acetic acid essentially as described in Example I, section B except that acetone was used as the solvent in place of methanol. The acetone solution weighed 60 parts and had a solids content of 37%.

C. *Preparation of printing relief images*

To the above acetone solution, there was added 0.22 part of benzoin methyl ether and 0.002 part of hydroquinone and the resulting solution was cast on glass plates. Removal of the acetone at room temperature in subdued light gave a clear transparent film. Exposure of the film under a suitable negative and removal of the unexposed material essentially as described in Example I, section C gave a hard, scratch-resistant image of excellent sharpness. Similar images were obtained from the polyvinyl acetal compositions derived from o-methacrylyloxybenzaldehyde and (1) 86–89% hydrolyzed medium viscosity polyvinyl alcohol, (2) completely hydrolyzed medium viscosity polyvinyl alcohol and (3) completely hydrolyzed high viscosity polyvinyl alcohol.

EXAMPLE XIX

Thick films of the polyvinyl acetal of Example I were prepared by an extrusion process as follows: To 392 parts of a methanol solution containing 133 parts of the m-methacrylamidobenzaldehyde polyvinyl acetal, there was added 1.35 parts of benzoin methyl ether, 0.005 part of hydroquinone, 160 parts of methanol and 100 parts of water. The resulting clear solution was poured slowly into 12,000 parts of distilled water in which had been dissolved 30 parts of sodium bicarbonate. The polyvinyl acetal, ether and hydroquinone precipitated as a white mass which was gathered into a lump and kneaded to work out excess water and methanol. The mixture at this stage was a coherent, opaque white mass which contained approximately 37% by weight of solvent. This dough was fed through a screw extruder with the barrel, head and die temperatures at 35–40° C. A beading die was used. Large amounts of water were squeezed out during the first passage through the die and the extruded material was recycled, after which it emerged as a transparent amber cylindrical filament about ⅛ inch in diameter. The water content was approximately 20–25%, by weight. At this point, the beading die was replaced by a film die which included a screen pack filter consisting of two 100 mesh screens between two 50 mesh screens. The film die, about 3 inches in width, was set with lips 0.034" apart. The transparent bead was passed into the extruder again, this time passing through the film die. The film of polyvinyl acetal and initiator obtained was clear and flat if a slight tension was kept on the film as it left the die lips. The thickness of the extruded film was 0.035 to 0.050 inch depending on the exact amount of tension used and the width, about 3 inches. Residual solvent was removed by festooning the extruded film and drying in a current of air.

Such extruded films were laminated to cold rolled steel base sheets 0.015" thick by a hot pressing operation. The steel sheets were prepared for this use by cleaning, spraying on a zinc chromate-pigmented polyvinyl butyral wash primer (as described in Plastic (London, England), pages 86–87+ (March 1953)), drying, and applying a thin anchor layer of the m-methacrylamidobenzaldehyde polyvinyl acetal from an alcoholic solution. This solution comprised 10 parts of the polymeric acetal, 0.03 part of benzoin methyl ether, 65 parts of methanol and 25 parts of n-butanol. After the anchor layer had dried thoroughly, the extruded film was simultaneously laminated to the base and the surface press-polished by pressing between polished plates at 100–120° C. for one minute at 300 lbs. per square inch. The film was cooled under pressure.

Such an m-methacrylamidobenzaldehyde polyvinyl acetal layer on a steel base plate was exposed in contact with a special negative containing lines of varying width, double rules, lines meeting at acute angles, dots of various sizes, reverse print areas, etc. Exposure time was 20 minutes and the surface of the transparency was placed at a distance of 8 to 10 inches from a bank of sixteen 30-watt fluorescent lamps which have a phosphor showing peak emission at 3500–3600 A. (BL-360 type). The exposed plate was gently brushed in a tray of methanol at 40–45° C. to remove the unexposed areas. The plate was then rinsed and given a brief additional exposure to further harden the addition-polymerized polyvinyl acetal printing relief image. This plate was locked on the cylinder of a rotary printing press and printed in the normal manner. The test was discontinued after upwards of 50,000 impressions had been made since little or no wear was evident. Reproduction of the fine detail present in the negative was excellent. Additional accelerated wear tests using an abrasive ink and paper on plates made from this polyvinyl acetal printing relief showed that the material is approximately equivalent to copper electrotypes in wear resistance.

A halftone plate from a 150-line screen negative was prepared by exposing and processing a photosensitive polyvinyl acetal layer laminated to a metal base plate as described above. The plate obtained gave a printed image of excellent tonal gradation with dots 0.001 to 0.002 inch in diameter present in the extreme highlights.

In place of the unsaturated aldehydes used in the examples, there can be substituted other unsaturated monoaldehydes (i.e., aldehydes having a vinylidene group in a conjugated structure independent of the aldehyde carbonyl) which can be reacted, as such or in the form of a monomeric acetal of a simple monohydric or dihydric alcohol, e.g., methanol, ethanol or ethylene glycol, with a polymeric polyhydric alcohol to form a polyvinyl acetal, including acrylamidoacetaldehyde, $$CH_2{=}CH{-}CO{-}NH{-}CH_2{-}CHO$$

β-(methyacrylamidopropionaldehyde, $$CH_2{=}\underset{\displaystyle CH_3}{C}{-}CO{-}NH{-}CH_2{-}CH_2{-}CHO$$

α-vinylcrotonaldehyde $$CH_2{=}CH{-}\underset{\displaystyle CHO}{C}{=}CH{-}CH_3$$

α-phenylacrolein, $$CH_2{=}\underset{\displaystyle C_6H_5}{C}{-}CHO$$

o-acrylyloxybenzaldehyde, $$CH_2{=}CH{-}CO{-}O{-}C_6H_4{-}CHO$$

m-(α-ethylacrylamido)benzaldehyde, $$CH_2{=}\underset{\displaystyle C_2H_5}{C}{-}CO{-}NH{-}C_6H_4{-}CHO$$

1-vinyl-4-naphthaldehyde,

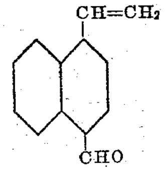

2-acrylamido-4-naphthaldehyde,

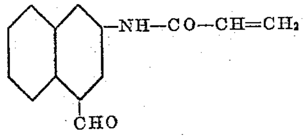

4-vinyl-4'-formylbiphenyl,

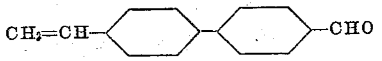

p-(2-methacrylyloxyethoxy)benzaldehyde,

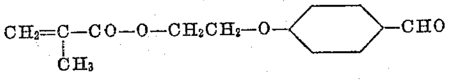

and the like.

The preferred polyvinyl acetals are those derived from unsaturated aldehydes having from 5 to 15 carbon atoms and particularly those which are derived from an aromatic aldehyde, since films from such polyvinyl acetals and their addition polymers are harder and dimensionally more stable than others. Within this embodiment of the invention, the preferred polyvinyl acetals are those derived from aldehydes of the general formula:

$$CH_2{=}\underset{\displaystyle Y}{C}{-}(R)_m{-}(X{-}Q)_n{-}R'{-}CHO$$

where Y is hydrogen or alkyl of one to two carbon atoms, i.e., methyl or ethyl; R and R' are aromatic carbocyclic radicals, preferably arylene; X is carbonyl, —CO—, or sulfonyl, $—SO_2—$; Q is oxygen, —O—, or imino, —NH—; and $m$ and $n$ are 0 or 1, or their dimethyl, diethyl or ethylene glycol acetals.

In the embodiment of the invention wherein the conjugated vinylidene unsaturation is furnished partly or entirely by a group other than the acetal group, the unsaturated radical can be any non-acetal radical containing a vinylidene group which is part of a conjugated system of double bonds. For example, it can be a carboxylic acid ester group, or a sulfonic acid ester group, or an ether group. Preferably, it is a carboxylic acid ester group, e.g., the ester groups derived from acrylic, methacrylic, α-ethylacrylic, β-vinylacrylic, α-chloroacrylic, α-phenylacrylic, p-vinylbenzoic acids, and the like. The most useful of such unsaturated substituents are the ester radicals corresponding to α-methylene monocarboxylic acids, and particularly to such acids having from three to five carbon atoms. In this type of polymers, the acetal groups can be supplied by any aldehyde, which may be saturated or unsaturated (in which latter case conjugated vinylidene groups may be present in both the acetal group and the auxiliary, e.g., ester groups). Suitable aldehydes include, for example, formaldehyde, acetaldehyde, propionaldehyde, isobutyraldehyde, furfural, cyclohexylaldehyde, o-chlorobenzaldehyde, salicylaldehyde, cinnamaldehyde, phenylacetaldehyde, the naphthaldehydes, 1-chloro-2-naphthaldehyde, anthraldehydes and benzamidoacetaldehydes. Preferably, the aldehyde furnishing the acetal groups is one having from one to fifteen carbon atoms. Still more preferably, it is an aromatic aldehyde of from seven to eleven carbon atoms in which the aldehyde group is directly attached to annular carbon of an aromatic carbocyclic ring.

As has been shown in several of the examples, the polyvinyl acetals of this invention may also have saturated, inert substituents, whose main purpose is to decrease the number of available hydroxyl groups and therefore the water-sensitivity of the polymeric compositions. Such inert substituents are preferably carboxylic ester groups, e.g., acetate, propionate, n-butyrate groups and preferably acetate groups, which are originially present in the starting material. Other preferred inert substituents are acetal groups derived from ethylenically saturated aldehydes, preferably aromatic aldehydes such as benzaldehyde, o-chlorobenzaldehyde, p-benzoxybenzaldehyde, and the like.

This invention also includes photopolymerizable elements suitable for the preparation of printing relief images. Thus, it has been found that letterpress printing plates which have uniform printing height can be prepared by exposing with actinic light through a process transparency, e.g., a process negative or positive (an image-bearing transparency consisting solely of substantially opaque areas and substantially transparent areas where the opaque areas are substantially of the same optical density, the so-called line or halftone negative or positive) a photopolymerizable layer or stratum comprising an unsaturated polyvinyl acetal of this invention having intimately dispersed therethrough an addition polymerization initiator activatable by actinic light, said layer or stratum being superposed in a suitable adherent support, i.e., adherent to the photopolymerized composition, until substantially complete crosslinking through the vinylidene groups takes place in the exposed areas, while substantially none takes place in the non-exposed areas, and essentially completely removing the layer, e.g., the non-crosslinked polymer together with any admixed material, in said non-exposed areas.

The ethylenically unsaturated polyvinyl acetal layer being transparent to actinic light is photopolymerized, i.e., crosslinked and rendered insoluble clear through to the support in the light-exposed areas, whereas the areas not exposed remain in substantially their original state, that is, no significant crosslinking takes place in the areas protected by the opaque images in the process transparency. The unexposed, and therefore non-crosslinked, material is then removed by treating the layer with a solvent for the original polyvinyl acetal. The crosslinked (exposed) portions being insoluble in practically all solvents remain unattacked, forming the relief image.

The thickness of the photopolymerizable layer is a direct function of the thickness desired in the relief image and this will depend on the subject being reproduced and particularly on the extent of the non-printing areas. In the case of photopolymerized halftones, the screen used also is a factor. In general, the thickness of the polyvinyl acetal layer to be photopolymerized on the base plate will vary from 0.003 to 0.25 inch. Layers ranging from 0.003 to 0.03 inch in thickness and usually from 0.003 to 0.007 inch will be used for halftone plates. Layers ranging from 0.01 to about 0.06 inch in thickness will be used for the majority of letterpress printing plates, including those wherein halftone and line images are to be combined, and it is with these thicknesses that the process of this invention is particularly effective. Layers thicker than 0.05–0.06 inch will be used for the printing of designs and relatively large areas in letterpress printing plates.

Actinic light from any source and of any type can be used in carrying out this process. The light may emanate from point sources or be in the form of parallel rays or divergent beams. In order to reduce the exposure time, however, it is preferred to use a broad light source, i.e., one of large area as contrasted to a point source of light, close to the image-bearing transparency from which the relief image is to be made. By using a broad light source, relatively close to the image-bearing transparency, the light rays passing through the clear areas of the transparency will enter as divergent beams into the photopolymerizable layer, and will thus irradiate a continually diverging area in the photopolymerizable layer underneath the clear portion of the transparency, resulting in the formation of a polymeric relief which is at its greatest width at the bottom surface of the photopolymerized layer, the top surface of the relief being the dimensions of the clear area. Such relief images are advantageous in printing plates because of their greater strength and the smooth continuous slope of their sides as contrasted to the undercut or jagged, irregular nature of the sides of photoengraved reliefs. This is of importance since the smooth sloping reliefs obtained in this process reduce or eliminate the problem of ink-buildup that is always encountered with photoengraved plates.

Inasmuch as the photopolymerization initiators or catalysts generally exhibit their maximum sensitivity in the ultraviolet range, the light source should furnish an effective amount of this radiation. Such sources include carbon arcs, mercury vapor arcs, fluorescent lamps with special ultraviolet light emitting phosphors, argon glow lamps, and photographic flood lamps. Of these, the mercury vapor arcs, particularly the sunlamp type, and the fluorescent sunlamps, are most suitable. Groups of these lamps can be easily arranged to furnish the broad light source required to give a frustum-shaped relief image of good mechanical strength. The sun-lamp mercury vapor arcs are customarily used at a distance of 7 to 10 inches from the photopolymerizable layer. On the other hand, with a more uniform extended source of low intrinsic brilliance, such as a group of contiguous fluorescent lamps with special phosphors, the plate can be exposed within an inch of the lamps.

The base material used can be any natural or synthetic product, capable of existence in film or sheet form and can be flexible or rigid, reflective or non-reflective of actinic light. Because of their generally greater strength in thinner form, e.g., foils, and readier adaptability for use in printing presses, it is preferable to use metals as the base materials. However, where weight is critical, the synthetic resins or superpolymers, particularly the thermoplastic ones, are preferable base materials. In those instances where rotary press plates are desired both types of base or support materials can be used to form flat relief plates which are then formed to the desired shape. The thermoplastic resins or high polymers are particularly suitable base materials in such uses. Such rotary press plates can also be prepared by using cylindrically shaped base plates of the various types carrying the photopolymerizable compositions and exposing them directly through a concentrically disposed image-bearing transparency in like manner.

Suitable base or support materials include metals, e.g., steel, zinc and aluminum plates including grained zinc or aluminum plates, sheets and foils, and films or plates composed of various film-forming synthetic resins or high polymers, and in particular the vinylidene polymers, e.g., the vinyl chloride polymers, vinylidene chloride copolymers with vinyl chloride, vinyl acetate, styrene, isobutylene and acrylonitrile; and vinyl chloride copolymers with the latter polymerizable monomers; the linear condensation polymers such as the polyesters, e.g., polyethylene terephthalate; the polyamides, e.g., polyhexamethylene sebacamide; polyester amides, e.g., polyhexamethylene-adipamide/adipate; etc. Fillers or reinforcing agents can be present in the synthetic resin or polymer bases such as the various fibers (synthetic, modified, or natural), e.g., cellulosic fibers, for instance, cotton, cellulose acetate, viscose rayon, paper; glass wool; nylon, and the like. These reinformed bases may be used in laminated form.

When highly reflective bases and particularly metal base plates are used, any oblique rays passing through clear areas in the image-bearing transparency will strike the surface of the base at an angle other than 90° and after resultant reflection will cause polymerization in non-image areas. The degree of unsharpness in the relief progressively increases as the thickness of the desired relief and the duration of the exposure increases. It has been found that this disadvantage can be overcome when the photopolymerizable composition is deposited on a light-reflective base by having an intervening stratum sufficiently absorptive of actinic light so that less than 35% of the incident light is reflected. This light-absorptive stratum must be adherent to both the photopolymerized image and the base material. A practical method of supplying the layer absorptive of reflected light, or non-halation layer, is to disperse a finely-divided dye or pigment which substantially absorbs actinic light in a solution or aqueous dispersion of a resin or polymer which is adherent to both the support and the photopolymerized image and coating it on the support to form an anchor layer which is dried. If desired, the antihalation layer may be disposed on the back surface where a transparent film or plate is used as a support for the photopolymerizable layer.

For use as photopolymerizable layers for printing relief images, the compositions of this invention may contain, in addition to the unsaturated polyvinyl acetals, photopolymerizable monoethylenic monomers which, when converted to linear polymers, serve to improve the properties of the relief image, such as its solvent resistance. Such additional materials include monounsaturated vinylidene monomers, particularly the acrylic and α-alkylacrylic esters, nitriles and amides, and specifically acrylamide and methacrylamide. These additional components are preferably used in amounts between 5% and 35% of the weight of the total composition. In use, they photopolymerize in the exposed portions of the light-sensitive layer, and any unpolymerized (i.e., unexposed) portion of these added monomers is readily removed by solvent treatment at the same time as the non-crosslinked portions of the unsaturated polyvinyl acetal.

The photopolymerizable layers may also, if desired, comprise other compatible monomeric or polymeric polyunsaturated materials which, under the influence of actinic light, polymerize to crosslinked insoluble polymers. These agents improve the rate or extent of the crosslinking throughout the photopolymerizable layer, and their presence facilitates the removal of the unexposed areas; they also serve to plasticize the compositions when an initially softer composition is desired. A useful class of such materials are the monomers or low polymers con taining two terminal ethylenic unsaturations, preferably in conjugated systems. Suitable examples are the methacrylic and acrylic acid diesters of ethylene glycol, diethylene glycol, and the low molecular weight polyethylene glycols; methacrylic and acrylic acid diesters of polymethylene glycols such as trimethylene glycol, hexamethylene glycol, etc.; divinylbenzene, crotyl methacrylate, diallyl phthalate, diallyl maleate, triallyl cyanurate, etc. These additional crosslinking agents are preferably used in amounts between 1% and 40% by weight of the total compositions.

The photopolymerizable layers can also contain immiscible polymeric or non-polymeric organic or inorganic fillers or reinforcing agents which are essentially transparent, e.g., the organophilic silicas, bentonites, silica, powdered glass, etc. having a particle size less than 0.4 mil and in amounts varying with the desired properties of the photopolymerizable layer.

Even when containing monomeric or low polymeric additives as described above, the photopolymerizable compositions of this invention are solids. While their hardness varies from medium hard to very hard, they are nevertheless substantially non-deformable under ordinary conditions, and non-tacky. Thus, they offer considerable physical advantages over photopolymerizable compositions obtained as liquids, viscous liquids or semi-solid gels from the standpoint of forming into convenient elements for commercial printing use.

Practically any initiator or catalyst of addition polymerization which is capable of initiating polymerization under the influence of actinic light can be used in the photopolymerizable poly-initiator layer of this invention. Because transparencies transmit both heat and light and the conventional light sources give off heat and light, the preferred initiators of addition polymerization are not activatable thermally. They should be dispersible in the unsaturated polyvinyl acetal to the extent necessary for initiating the desired polymerization under the influence of the amount of light energy absorbed in relatively short term exposures. Precautions can be taken to exclude heat rays so as to maintain the photopolymerizable layer at temperatures which are not effective in activating the initiator thermally, but they are troublesome. In addition, exclusion of heat rays makes necessary longer exposure times since the rate of chain propagation in the polymerization reaction is lower at reduced temperatures. For this reason, the photoinitiators most useful for this process are those which are not active thermally at temperatures below about 80° C. These photopolymerization initiators are used in amounts of from 0.05 to 5% and preferably from 0.1 to 2.0% based on the weight of the total photopolymerizable composition.

Suitable photopolymerization initiators or catalysts include vicinal ketaldonyl compounds such as diacetyl, benzil, etc.; α-ketaldonyl alcohols such as benzoin, pivaloin, etc.; acyloin ethers such as benzoin methyl or ethyl ethers; α-hydrocarbon substituted aromatic acyloins including α-methylbenzoin, α-allylbenzoin, and α-phenylbenzoin.

The solvent liquid used for washing or "developing" the plates made from the photopolymerizable compositions of this invention must be such that it has good solvent action on the linear, i.e., non-crosslinked, polyvinyl acetal, and has little action on the hardened image or upon the base material, non-halation layer, or anchor layer in the time required to remove the non-crosslinked portions. Methanol or ethanol, particularly the former, and mixtures thereof with methyl or ethyl or propyl acetate, and especially ethyl acetate/ethanol mixtures, have been found to be well suited for a large variety of photopolymerizable compositions. An about 75/25 by weight blend of ethyl acetate and ethanol has a boiling range which is satisfactory since it is high enough to avoid blushing but at the same time is low enough that excess solvent evaporates readily. Alcohol/water mixtures, e.g., methanol/water mixtures, are desirable solvents in some cases. Low aliphatic ketones such as acetone, acetone/water mixtures, e.g., an 8/1 mixture, and methyl ethyl ketone are very satisfactory solvents, as is also dioxane. Other solvents such as propyl acetate, toluene, ethylene glycol monoethyl ether and mixtures thereof, are suitable but are not as convenient to use because of their lower evaporation rate. Mixtures of chlorinated aliphatic hydrocarbons such as dichloromethane, chloroform and carbon tetrachloride with methanol are also useful, though less generally so.

This invention provides a simple, effective process for producing letterpress printing plates from inexpensive materials and with a marked reduction in labor requirements over the conventional photoengraving procedure. The images obtained are sharp and show fidelity to the original transparency both in small details and in overall dimensions. In addition, the process allows the preparation of many types of ruled line plates which could ordinarily be handled only by the tedious wax engraving technique. Moreover, these photopolymerized plates allow much more efficient use of valuable press time since the flatness of the printing surfaces reduces the amount of make-ready required on the press. The smooth clean shoulders of the image minimize ink buildup during use and save much of the time spent in cleaning operations during a press run. Another important advantage arises from the fact that the resilience and abrasion resistant characteristics of the photopolymerized printing plates make the plate more durable in use than ordinary metal photoengravings. In fact, under optimum conditions the photoyolymerized printing plates show wear resistance equivalent to that of the expensive nickel-faced electrotypes. An important commercial advantage is their lightness in weight.

The photopolymerized printing plates can serve as originals for the preparation of stereotypes or electrotypes although in the latter case if only duplicates are desired, it is much more convenient and economical to make duplicate photopolymerized plates. Curved plates for use on rotary presses can be prepared easily by bending the flat plates. It may be desirable in some cases to heat the plates sufficiently (generally from 100° to 120° C.) to soften the image layer. It is also possible to prepare curved plates directly by polymerization against a curved negative surface.

The printing elements of this invention can be used in all classes of printing but are most applicable to those classes of printing wherein a distinct difference of height between printing and non-printing areas is required. These classes include those wherein the ink is carried by the raised portion of the relief such as in dry-offset printing, ordinary letterpress printing, the latter requiring greater height differences between printing and non-printing areas and those wherein the ink is carried by the recessed portions of the relief such as in intaglio printing, e.g., line and inverted halftone. The plates are obviously useful for multicolor printing.

The use of the unsaturated polyvinyl acetals of this invention as photopolymerizable printing relief elements has been described at length in view of its importance. These polymers, however, are also suitable for many other applications in which readily crosslinkable polymers are useful, such as the preparation of filaments, foils, coatings, pellicles, sheets and other shaped or cast objects of excellent hardness and scratch resistance.

The embodiments of the invention in which an exclusive property or privilege is claimed are defined as follows:

1. A linear polyvinylacetal containing a plurality of extralinear groups having terminal vinylidene groups in a 1,3-conjugated double bond system, said acetal being that of (1) a linear polymeric polyhydric alcohol having a large number of recurring intralinear —$CH_2CHOH$— groups and a molecular weight of at least 5000 with (2) an aldehyde, said acetal containing recurring intralinear —$CH_2CHOH$— groups and intralinear groups of the formula:

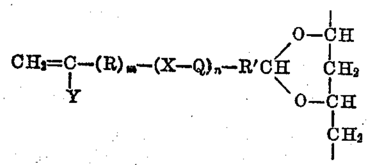

wherein Y is a member taken from the group consisting of hydrogen and alkyl of 1 to 2 carbon atoms, R and R′ are arylene radicals, X is a member taken from the group consisting of —CO— and —$SO_2$—, Q is a member taken from the group consisting of —O— and —NH— and *m* and *n* are members taken from the group consisting of 0 and 1, between 10 and 90% of the hydroxyl groups of the unacetalized polyhydric alcohol being acetalized, the ratio of total acetal groups to acetal groups bearing vinylidene groups being in the range of about 10:1 to about 1:1, said acetal having less than 15% of said —$CH_2CHOH$— groups in the form of free hydroxyl groups.

2. A polyvinyl acetal as defined in claim 1 wherein said aldehyde is p-vinylbenzaldehyde.

3. A polyvinyl acetal as defined in claim 1 wherein said aldehyde is methacrylyloxybenzaldehyde.

4. An acetal as set forth in claim 2 containing in addition to recurring extralinear acetal groups and intralinear —$CH_2CHOH$— groups, alpha-methylene monocarboxylic acid ester groups.

5. A linear methacrylamidobenzaldehyde polyvinyl acetal of a linear polymeric polyhydric alcohol having a large number of recurring intralinear —$CH_2CHOH$— groups and a molecular weight of at least 5000, between 10% and 90% of the hydroxy groups being acetalized with methacrylamidobenzaldehyde, the ratio of total acetal groups to methacrylamide groups being in the range of about 10:1 to about 1:1 and said polyvinyl acetal having less than 15% of the said —$CH_2CHOH$— groups in the form of free hydroxyl groups.

6. A photopolymerizable composition comprising a support bearing a photopolymerizable layer comprising a linear polyvinylacetal containing a plurality of extralinear groups having terminal vinylidene groups in a 1,3-conjugated double bond system, said acetal being that of (1) a linear polymeric polyhydric alcohol having a large number of recurring intralinear —$CH_2CHOH$— groups and a molecular weight of at least 5000 with (2) an aldehyde, said acetal containing recurring intralinear

—$CH_2CHOH$— groups and intralinear groups of the formula:

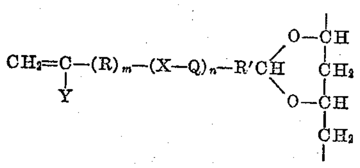

wherein Y is a member taken from the group consisting of hydrogen and alkyl of 1 to 2 carbon atoms, R and R′ are arylene radicals, X is a member taken from the group consisting of —CO— and —$SO_2$—, Q is a member taken from the group consisting of —O— and —NH— and *m* and *n* are members taken from the group consisting of 0 and 1, between 10% and 90% of the hydroxyl groups of the unacetalized polyhydric alcohol being acetalized, the ratio of total acetal groups to acetal groups bearing vinylidene groups being in the range of about 10:1 to about 1:1, said acetal having less than 15% of said —$CH_2CHOH$— groups in the form of free hydroxyl groups, and an addition polymerization initiator therefor activatable by actinic light in an amount from 0.05% to 5.0% by weight of said composition.

7. A photopolymerizable composition as set forth in claim 6 wherein the said aldehyde is p-vinylbenzaldehyde.

8. A photopolymerizable composition as set forth in claim 6 wherein said aldehyde is methacrylyloxybenzaldehyde.

9. A composition as set forth in claim 6 containing a compatible non-gaseous ethylenically unsaturated monomer in an amount between 5% and 35% of the weight of the total composition.

10. A photopolymerizable composition comprising a support bearing a photopolymerizable layer comprising a linear methacrylamidobenzaldehyde polyvinyl acetal of a linear polymeric polyhydric alcohol having a large number of recurring intralinear —$CH_2CHOH$— groups and a molecular weight of at least 5000, between 10% and 90% of the hydroxy groups being acetalized with methacrylamidobenzaldehyde, the ratio of total acetal groups to methacrylamide groups being in the range of about 10:1 to about 1:1 and said polyvinyl acetal having less than 15% of the said —$CH_2CHOH$— groups in the form of free hydroxyl groups, and an addition polymerization initiator therefor activatable by actinic light in an amount from 0.05% to 5.0% by weight of said composition.

11. A photopolymerizable element comprising a sheet support bearing a photopolymerizable layer comprising a linear polyvinylacetal containing a plurality of extralinear groups having terminal vinylidene groups in a 1,3-conjugated double bond system, said acetal being that of (1) a linear polymeric polyhydric alcohol having a large number of recurring intralinear —$CH_2CHOH$— groups and a molecular weight of at least 5000 with (2) an aldehyde, said acetal containing recurring intralinear $CH_2CHOH$— groups and intralinear groups of the formula:

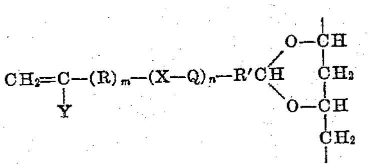

wherein Y is a member taken from the group consisting of hydrogen and alkyl of 1 to 2 carbon atoms, R and R′ are arylene radicals, X is a member taken from the group consisting of —CO— and —$SO_2$—, Q is a member taken from the group consisting of —O— and —NH— and *m* and *n* are members taken from the group consisting of 0 and 1, between 10% and 90% of the hydroxyl groups of the unacetalized polyhydric alcohol being acetalized, the ratio of total acetal groups to acetal groups bearing, vinylidene groups being in the range of about 10:1 to about 1:1, said acetal having less than 15% of said —$CH_2CHOH$— groups in the form of free hydroxyl groups, and an addition polymerization initiator therefor activatable by actinic light in an amount from 0.05% to 5.0% by weight of said layer.

12. An element as set forth in claim 11 wherein said aldehyde is p-vinylbenzaldehyde.

13. An element as set forth in claim 11 wherein said aldehyde is methacrylyloxybenzaldehyde.

14. An element as set forth in claim 11 wherein the photopolymerizable layer contains a compatible non-gaseous ethylenically unsaturated monomer in an amount between 5% and 35% of the weight of the composition.

15. A photopolymerizable element comprising a sheet support bearing a photopolymerizable layer comprising a linear methacrylamidobenzaldehyde polyvinyl acetal of a linear polymeric polyhydric alcohol having a large number of recurring intralinear —$CH_2CHOH$— groups and a molecular weight of at least 5000, between 10% and 90% of the hydroxy groups being acetalized with methacrylamidobenzaldehyde, the ratio of total acetal groups to methacrylamide groups being in the range of about 10:1 to about 1:1 and said polyvinyl acetal having less than 15% of the said —$CH_2CHOH$— groups in the form of free hydroxyl groups, and an addition polymerization initiator therefor activatable by actinic light in an amount from 0.05% to 5.0% by weight of said layer.

References Cited in the file of this patent

UNITED STATES PATENTS

| | | |
|---|---|---|
| 2,310,943 | Dorough et al. | Feb. 16, 1943 |
| 2,332,896 | D'Alelio | Oct. 26, 1943 |
| 2,367,661 | Agre | Jan. 23, 1945 |
| 2,533,454 | Gresham | Dec. 12, 1950 |
| 2,607,684 | Nowak et al. | Aug. 19, 1952 |
| 2,640,815 | Whetstone et al. | June 2, 1953 |
| 2,641,576 | Sachs et al. | June 9, 1953 |
| 2,647,080 | Joyce | July 28, 1953 |
| 2,728,745 | Smith et al. | Dec. 27, 1955 |
| 2,751,373 | Unruh et al. | June 19, 1956 |
| 2,757,090 | Neugebar et al. | July 31, 1956 |
| 2,760,863 | Plambeck | Aug. 28, 1956 |

FOREIGN PATENTS

| | | |
|---|---|---|
| 459,878 | Great Britain | Jan. 18, 1937 |